Aug. 14, 1962 — L. J. BISHOP — 3,049,218
SORTING SYSTEM FOR POST OFFICES AND THE LIKE
Original Filed Feb. 4, 1957 — 3 Sheets-Sheet 1

INVENTOR.
LEONARD J. BISHOP
ATTORNEYS

Aug. 14, 1962 L. J. BISHOP 3,049,218
SORTING SYSTEM FOR POST OFFICES AND THE LIKE
Original Filed Feb. 4, 1957 3 Sheets-Sheet 2
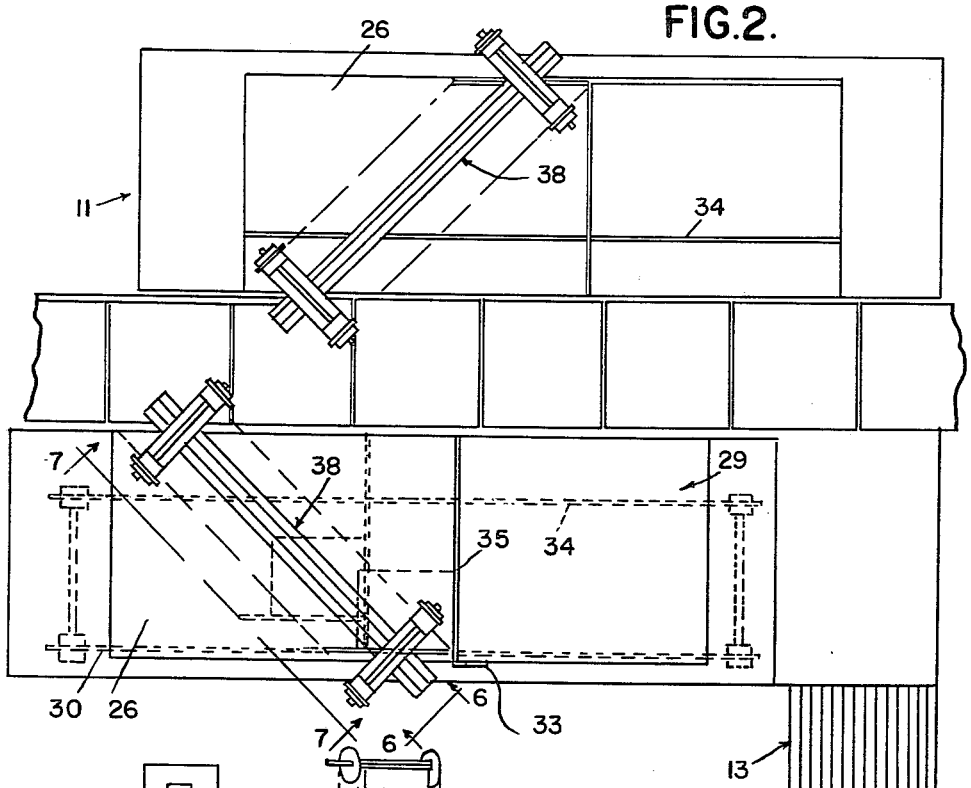
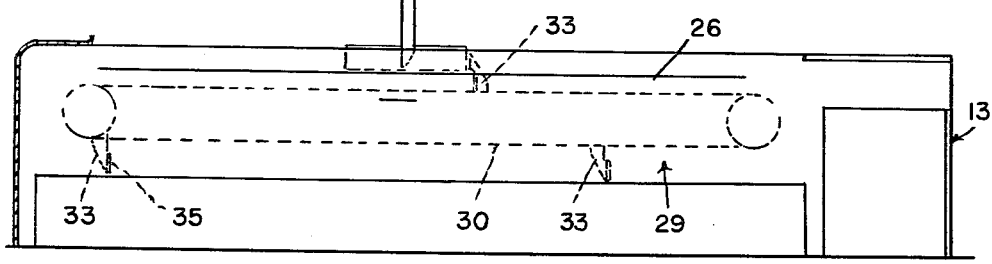
INVENTOR.
LEONARD J. BISHOP
BY *Whittemore, Hulbert & Belknap*
ATTORNEYS Aug. 14, 1962  L. J. BISHOP  3,049,218
SORTING SYSTEM FOR POST OFFICES AND THE LIKE
Original Filed Feb. 4, 1957  3 Sheets-Sheet 3
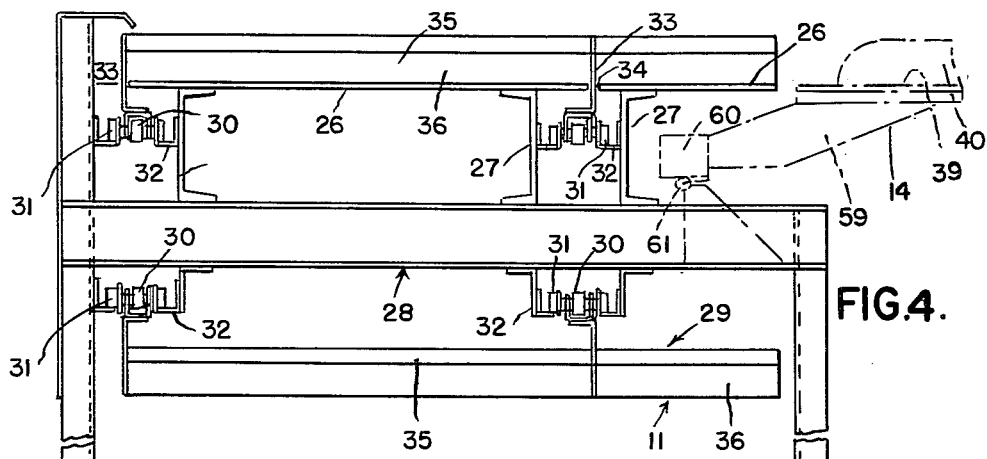
INVENTOR.
LEONARD J. BISHOP
BY
ATTORNEYS

3,049,218
SORTING SYSTEM FOR POST OFFICES AND THE LIKE

Leonard J. Bishop, Birmingham, Mich., assignor to Mechanical Handling Systems, Inc., Detroit, Mich., a corporation of Michigan
Original application Feb. 4, 1957, Ser. No. 637,999. Divided and this application Nov. 23, 1959, Ser. No. 854,731
7 Claims. (Cl. 198—188)

The present invention relates to an improved article sorting method and system for post offices and generally related installations. More particularly, the invention as disclosed deals with apparatus intended for use in the primary parcel sorting phase of a postal operation in which parcels and the like are roughly or relatively generally classified as to their destination, i.e., state, city, district, borough or like subdivision, depending on the particular installation. Although the invention shown herein is specially devised as a loading component of a system to expedite post office sorting, it will become evident as the description proceeds that the system and its component units also lend themselves to other settings.

The present application is a division of my copending application, Serial No. 637,999, filed February 4, 1957, and entitled "Sorting System for Post Offices and the Like."

A general object of the invention is to provide a loading unit for a sorting system of a type which includes a continuously traveling horizontal conveyor composed of parcel transporting receptacles articulated end to end to one another and adapted to selectively discharge at a series of destination chute stations, and to this end the loading unit is devised to deliver objects to the traveling receptacles at a speed sufficient to keep up with that of the conveyor.

More specifically, it is an object of the invention to provide an improved primary loading station or unit which includes a flighted push bar type conveyor operating to forward parcels placed thereon in a direction paralleling the main, receptacle carrying conveyor path, and in timed relation to its advance, to an improved, diagonally acting transfer member mechanism, also synchronized accurately with the main conveyor. This mechanism includes an elongated blade disposed parallel to and at one side of the path of movement of the flight conveyor, but transported diagonally at such an angle relative to the latter, and at the same speed as to its longitudinal, parallel component, so as to maintain a parcel pushed by a conveyor flight under the positive control of that flight and the transfer blade at all times. Hence a parcel is unfailingly delivered accurately onto a selected conveyor receptacle.

A still further object is to provide primary sorting machine loading equipment as described in the preceding paragraph, in which novel provision is made to clear the transfer blade above the push bar of the flight type conveyor upon a return stroke of the transfer blade away from the main conveyor. This is accomplished by employing a horizontal, angularly disposed chain trained about transversely spaced sprockets arranged at an angle to the main conveyor. The transfer blade is carried by this chain, being appropriately guided for horizontal rectilinear movement. The blade is also appropriately guided for vertical movement as its chain rounds the sprocket adjacent the main conveyor, so as to be elevated above the push bar of the primary unit upon its return stroke.

The foregoing, as well as other objects, will be made more apparent as this description proceeds, especially when considered in connection with the accompanying drawings illustrating the invention, wherein:

FIG. 2 is a fragmentary plan view showing a pair of primary sorting and loading units or stations associated with oppoiste sides of one reach of the main conveyor, as an alternative arrangement to that of FIG. 1 wherein the stations are along one side only, and indicating more clearly the make-up of an individual unit;

FIG. 3 is a schematic side elevational view illustrating the relationship of a flight type table loading conveyor and an angularly acting transfer device of a unit shown in FIG. 2;

FIG. 4 is an end elevational view, as from the right of FIGS. 2 and 3, of the primary sorting and loading unit, its relation to a tiltable receptacle of the main conveyor being indicated in dot-dash line;

FIG. 5 is a fragmentary perspective view indicating the general nature of the flight type, push bar conveyor at the primary loading station;

Figure 1:
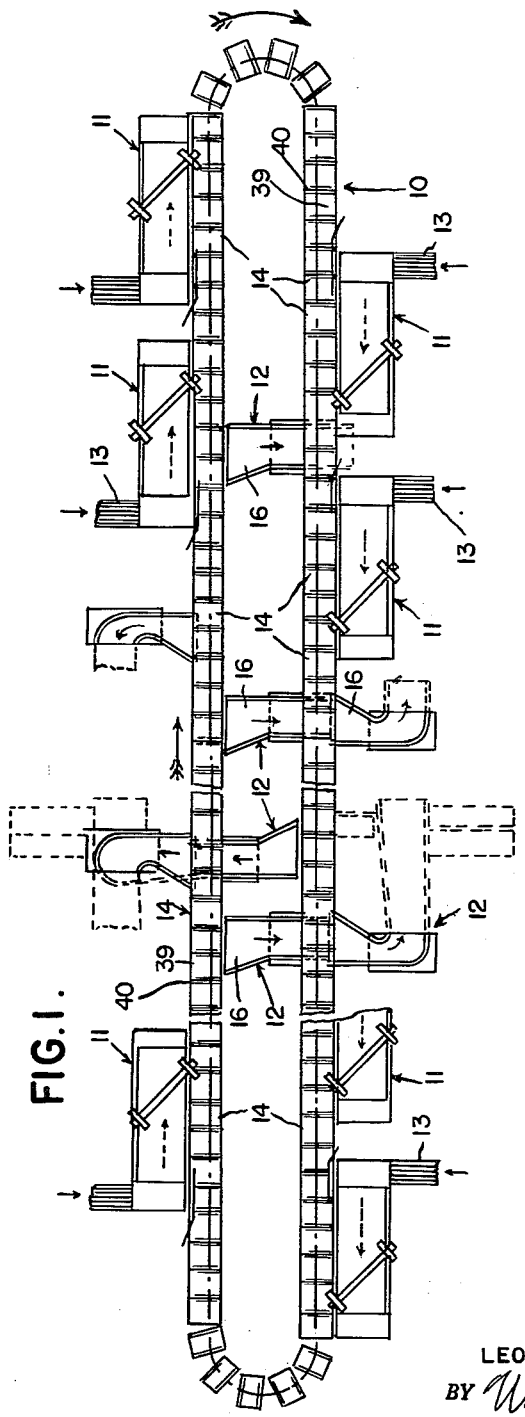
FIG. 1 is a generalized and schematic plan view of the basic components of a sorting system of the invention.

FIG. 6 is a fragmentary elevational view of the transfer mechanism of the equipment of FIGS. 2, 3 and 4, as viewed from the line 6—6 of FIG. 2; and FIG. 7 is a fragmentary elevation of this mechanism from the line 7—7 of FIG. 2.

Referring first to FIGS. 1 and 2 of the drawings, showing the general layout of the improved system or apparatus in accordance with my copending application identified above. The same consists essentially of a main endless conveyor 10 traveling a horizontal orbit in an elongated outline, with structural details of which conveyor the present invention is not concerned; a number of primary sorting and loading units or stations in accordance with the invention as dealt with herein, each generally designated 11 and located adjacent one or both of the ends of the elongated conveyor path; and a series of destination chutes or chute stations, each generally designated 12, past which the conveyor 10 travels, these chutes being spaced in longitudinal succession and on either side of each of the elongated parallel reaches of the conveyor 10. In the operation of the system operators or attendants at each of the individual primary sorting or loading units 11 take parcels from feeder units 13 adjacent thereto, ascertain the destination or other classification thereof, and place the same upon a push bar conveyor table of the unit 11 (to be described), whose function is to feed the parcel in question onto one of the articulated pans or receptacles 14 of the conveyor 10.

The attendant then manipulates a selected push button (corresponding to the ascertained destination) on a memory device mounted at the station 11, which is thus given a setting corresponding to the visually ascertained classification or destination. As described in my application identified above, following an interval sufficient to enable the conveyor 10 to transport the receptacle 14 in question and its load to the selected destination chute 12, a trip device at that chute is actuated, causing the receptacle to be tilted to one side or the other and thus gravitationally discharge the parcel to the chute.

In a typical large scale installation the chutes 12 are downwardly inclined and laterally angled from their respective receiving mouths 16 through the primary sorting floor to a further sorting floor therebelow, a chute at one side of main conveyor 10 discharging to the left and a chute at the opposite conveyor side discharging to the right.

Reference now being had to FIGS. 2 through 7, each of the primary sorting and loading units 11 comprises a horizontal plate-like table 26 fixedly supported in any appropriate fashion, as by the transversely spaced channels 27 (FIG. 4), on a basic channel frame-work 28.

A push bar type conveyor, generally designated 29, travels orbitally about the table 26 in a longitudinal path to one side of and paralleling the path of main conveyor 10. The conveyor 29 comprises a pair of parallel endless chains 30 carrying longitudinally spaced guide rollers 31 which travel on tracks or ways 32 supported by the framework. Push flight brackets 33 are secured to the links of the respective chains 30 at either side of table 26 proper. The arrangement is such, as shown in FIG. 4, that an outer bracket remote from the main conveyor 10, travels along the side of table 26 remote from that conveyor, while a near bracket is accommodated in its longitudinal travel in a slot 34 between the near edge of the loading table 26 proper and a coplanar extension 26' mounted by a channel 27 in the same manner as the table 26.

A transversely elongated pusher flight 35 is secured across the forward faces of each pair of brackets 33, this being equipped with a rubber facing 36 along its free or outer edge which wipes along the upper surface of loading table 26. There are three of the pusher flights 35 in the embodiment of the invention shown, and they are advanced longitudinally at the same speed as the main conveyor 10, the chains 30 being operated to this end from a conventional drive for the main conveyor 10, which it is not deemed necessary to show.

Each primary sorting and loading station 11 further comprises an angularly or diagonally acting transfer mechanism 38 (FIGS. 3, 4, 6 and 7) operating in conjunction with the pusher conveyor unit 29 and driven in accurately timed relation thereto by conventional operating connections (not shown). It is the function of the loading conveyor 29 and the transfer mechanism 38 to insure an accurately controlled advance of the parcels along the loading table 26 and its extension 26' and onto a receptacle 14 of the main conveyor 10. The floor plates 39 of the receptacles (FIG. 4) are unobstructed at their opposite longitudinal sides, and are flush or coplanar with the conveyor table 26, 26' immediately adjacent the edge thereof, as shown in FIG. 4. Each receptacle has upstanding front and rear parcel retaining walls 40.

The transfer mechanism 38 is appropriately supported on the framework of the loading and sorting unit 11 in such a way as not to obstruct the sliding movement of parcels on the table 26 of the latter. Structurally, the mechanism 28 comprises a transfer blade 42 whose length parallels the path of movement of push conveyor 29. The rear edge of the blade 42, as it is bodily moved by provisions to be described, is spaced only slightly in front of each advancing pusher flight 35, maintaining this spacing as it moves diagonally across the table 26, until the parcel is deposited by it and the flight onto the receptacle 14. The transfer blade 42 has an upright bar or rod 43 secured thereto at its midpoint, and this bar is guided for vertical movement between opposed pairs of grooved rollers 44 which are journaled in vertical spaced relation to one another in a guide unit 45.

The guide unit 45 is in turn equipped with pairs of laterally spaced, laterally projecting guide rollers 46 which travel in guide ways provided by elongated channels 47, which extend horizontally from a mount for the transfer mechanism 38 over the table 26. As shown in FIG. 6 of the drawings, the channels 47 are supported by an angle iron superstructure sustained by the framework 28 and generally designated 48, and are inclined diagonally of the table 26. Accordingly, an article forwarded by a pusher flight 35 is maintained under the positive control of that pusher, as well as under the positive side control of the synchronized transfer blade 42, as it is advanced in a corresponding diagonal path across the top of the table 26 and onto a main conveyor receptacle 14. As indicated above, the longitudinal speed of the pushers 35 and that of the longitudinal vector of the transfer blade speed are equal.

This transfer blade advance is occasioned by a pair of endless chains 50 trained about pairs of diagonally spaced end sprockets 51 disposed between the halves of the superstructure 48 and carried on shafts 52 journaled on and beneath the superstructure. The vertically guided upright bar or rod 43 of the transfer blade 42 is disposed between and pivotally connected to the chains 50, as by means of a pivot pin 53 midway of the length of the rod 43.

Accordingly, a diagonally forwarded parcel reaches the entry side of a conveyor receptacle 14 properly located so as to enter onto the floor plate 39 thereof without interference with either the front or rear wall members 40 of the receptacle.

As the pivoted transfer blade connection 53 travels (in the direction indicated by the arrow in FIG. 7) upwardly around the end sprocket 51 adjacent the main conveyor 10, it is lifted, and since the blade post or rod 43 runs between rollers 44, the transfer blade 42 is thus cleared above the top of the trailing pusher flight 35, in making its retractive stroke away from the conveyor 10. The transfer blade 42 of course terminates its parcel advancing and controlling movement short of the outer edges of the end wall members 40 of receptacles 14 of the conveyor 10, so that interference with the latter never takes place.

The chains 50 are driven positively, in synchronism with the other parts as described, by sprockets 54 affixed to the respective chain sprocket shafts 52 and by chains 55 which are trained about further sprockets 56 on a shaft 57 journaled on the upper part of the superstructure 48. The shaft 57 is driven by an appropriate connection (not shown) to the drive means for the main conveyor 10.

Structural features of the main parcel conveyor 10 are the subject matter of my copending application, and it need only be noted here that, as illustrated in FIG. 4, each receptacle 14 is equipped with a laterally projecting arm or bracket 59 on which a roller 60 is horizontally journalled, the roller 60 riding a fixed longitudinal cam track 61 to control the tilting of the receptacle at a chute station 12.

It will be apparent that although an installation involving the operation of four loading units or stations 11 and five discharge chute stations 12 has been shown and described, the system can be expanded to include almost any number of loading and discharge stations.

In the installation and use of the system, the synchronization of the pusher flights 35 of each station 11 of, say, four of the primary sorting and loading stations 11, is such that each station loads parcels on different pans or receptacles 14. Thus, as one group of four successive pans passes the four stations 11, a first station loads a first pan, a second station the second pan, the third station the third pan, and the fourth station the fourth pan. The next and all following groups of four pans each receive parcels in like manner; and it is evident that the system will not function properly if one pan or receptacle should receive parcels from two or more primary sorting and loading stations 11. Jamming and incorrect dispatch would result.

The advantage of the primary sorting and loading stations 11 is important and is two-fold. First, they relieve the operator of the necessity of placing parcels on a fast moving conveyor and thus speed up and relieve the strain of his work. Second, the timing of push bar conveyor 29 assures that the parcels are placed in proper pans which respond to the operator's signal. Considering the enormous quantity of parcels handled in larger post offices, both of these functions are very important. The transfer mechanism 38 operates in accurate conjunction with conveyor 29, and in timed relation to main conveyor 10, to insure an unfailing and jam free delivery of objects or parcels to the receptacles 14, regardless of the complexity of the system 10 as a whole.

What I claim as my invention is:

1. In parcel and like sorting equipment, a continuously driven main traveling conveyor, and a loading unit adapted to be positioned adjacent the path of said main traveling conveyor to feed parcels thereto, said unit comprising a continuously traveling loading conveyor acting to forward a parcel longitudinally in the general direction of main conveyor travel and at a speed coordinated with that of the latter, a transfer device acting in conjunction with said loading conveyor and at an acute angle to said direction to feed a parcel to said main conveyor, said transfer device including a transfer member engageable with a side of said parcel, and means to continuously move said member diagonally toward said main conveyor at a speed of the longitudinal vector component of said member equaling substantially the longitudinal speed of said loading conveyor.

2. Parcel and alike sorting equipment in accordance with claim 1, in which said loading conveyor is provided with at least one parcel engaging and forwarding flight, and in which said member of said transfer device maintains predetermined position forwardly of said flight in the feeding of a parcel by said device and loading conveyor to said main conveyor.

3. In parcel and like sorting equipment, a continuously driven main traveling conveyor, and a loading unit adapted to be positioned adjacent the path of said main traveling conveyor to feed parcels thereto, said unit comprising a continuously traveling loading conveyor acting to forward a parcel longitudinally in the general direction of main conveyor travel and at a speed coordinated with that of the latter, a transfer device acting in conjunction with said loading conveyor and at an acute angle to said direction to feed a parcel to said main conveyor, said transfer device including a transfer member engageable with a side of said parcel, and means to continuously move said member diagonally toward said main conveyor at one elevation in reference to said loading conveyor, and in predetermined spaced relation to the latter, and then away from said main conveyor at a greater elevation.

4. In parcel and like sorting equipment, a continuously driven main traveling conveyor, and a loading unit adapted to be positioned adjacent the path of said main traveling conveyor to feed parcels thereto, an endless flighted loading conveyor traveling continuously and acting to forward a parcel longitudinally and positively by a flight thereof in the general direction of main conveyor travel and at a speed coordinated with that of the latter, a transfer device acting in conjunction with said loading conveyor and at an acute angle to said direction to feed a parcel to said main conveyor, said transfer device including a transfer member engageable with a side of said parcel, and means to continuously move said member diagonally toward said main conveyor at one elevation in reference to said loading conveyor, and in predetermined position forwardly of said flight of the latter, and then away from said main conveyor at a greater elevation.

5. In parcel and like sorting equipment, a continuously driven main traveling conveyor, and a loading unit adapted to be positioned adjacent the path of said main traveling conveyor to feed parcels thereto, an endless flighted loading conveyor traveling continuously and acting to forward a parcel longitudinally and positively by a flight thereof in the general direction of main conveyor travel and at a speed coordinated with that of the latter, a transfer device acting in conjunction with said loading conveyor and at an acute angle to said direction to feed a parcel to said main conveyor, said transfer device including a transfer member engageable with a side of said parcel and means to continuously move said member diagonally toward said main conveyor at one elevation in reference to said loading conveyor, and in predetermined position forwardly of said flight of the latter, and then away from said main conveyor at a greater elevation, said moving means comprising an endless, horizontally operating actuator carrying said transfer member, and transversely spaced, horizontally journaled drive members about which said actuator is trained to direct the transfer member in a vertical orbit to and from said main conveyor.

6. In parcel and like sorting equipment of the type described, a continuously driven main traveling conveyor, and a loading unit adapted to be positioned adjacent the path of said main traveling conveyor to feed parcels thereto, said unit comprising an endless flighted device traveling continuously and acting positively by a flight thereof acting on the rear of a parcel to forward the same longitudinally in the general direction of conveyor travel and at a speed coordinated with that of the latter, a transfer device acting positively on a side of said parcel, in conjunction with said forwarding device and at an angle to said direction, to feed an article from said forwarding device to said main conveyor, said transfer device including a transfer blade engaging a side of the parcel, and means to continuously move said blade diagonally toward said main conveyor at one elevation relative to a flight of said forwarding device, and in predetermined position forwardly of said flight of the latter, and then away from said conveyor at a greater elevation.

7. In parcel and like sorting equipment of the type described, a continuously driven main traveling conveyor, and a loading unit adapted to be positioned adjacent the path of said main traveling conveyor to feed parcels thereto, said unit comprising an endless flighted device traveling continuously and acting positively by a flight thereof acting on the rear of a parcel to forward the same longitudinally in the general direction of main conveyor travel and at a speed coordinated with that of the latter, a transfer device acting positively on a side of said parcel, in conjunction with said forwarding device and at an angle to said direction, to feed an article from said forwarding device to said main conveyor, said transfer device including a transfer blade engaging a side of the parcel, and means to continuously move said blade diagonally toward said main conveyor at one elevation relative to a flight of said forwarding device and in predetermined position forwardly of said flight of the latter, and then away from said conveyor at a greater elevation, whereby to vertically clear said flight on a return stroke, said moving means comprising an endless horizontally operating chain pivotally carrying said transfer blade, diagonally spaced, horizontally journaled drive sprockets about which said actuator is trained, and means positively guiding said transfer blade for vertical motion throughout the orbit of said chain.

References Cited in the file of this patent
UNITED STATES PATENTS

| | | |
|---|---|---|
| 1,760,030 | Alger | May 27, 1930 |
| 2,666,535 | Dooley | Jan. 19, 1954 |